June 3, 1924.  E. J. JUTZ, SR  1,496,272
CHRISTMAS TREE STAND
Filed March 12, 1923
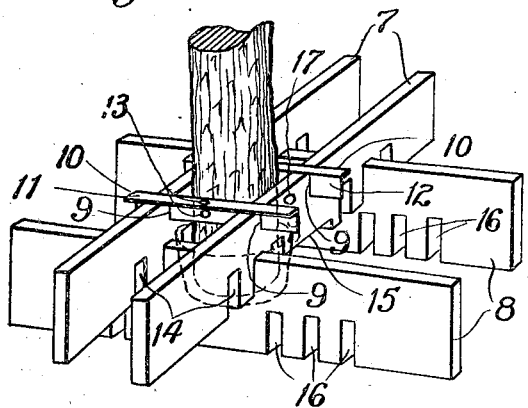
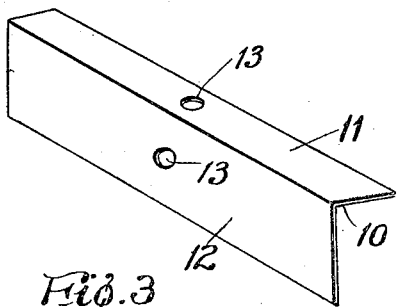
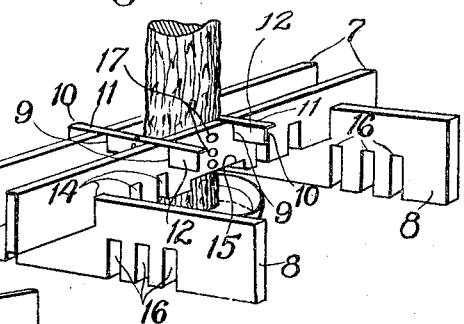
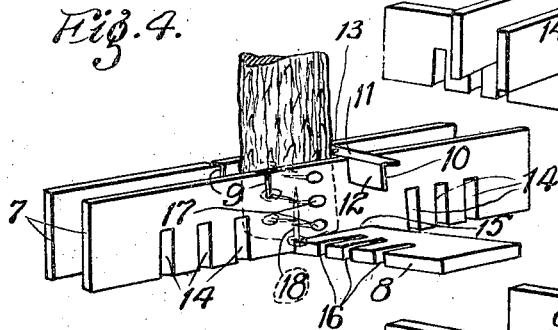
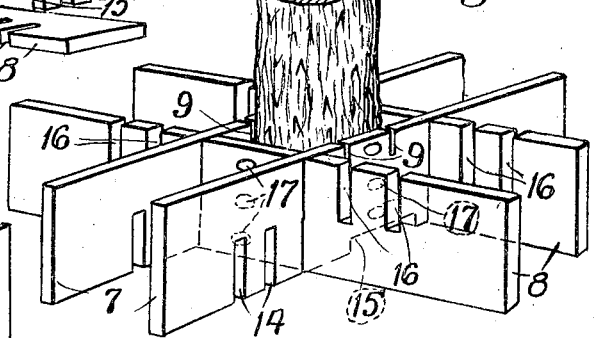
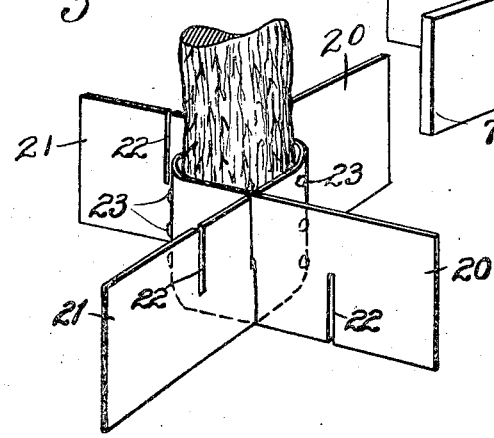
Inventor:
Edward J. Jutz Sr.
By Edward E. Longan
Attorney Patented June 3, 1924.

1,496,272

UNITED STATES PATENT OFFICE.

EDWARD J. JUTZ, SR., OF ST. LOUIS, MISSOURI.

CHRISTMAS-TREE STAND.

Application filed March 12, 1923. Serial No. 624,379.

*To all whom it may concern:*

Be it known that I, EDWARD J. JUTZ, Sr., a citizen of the United States, and resident of the city of St. Louis and State of Missouri, have invented certain new and useful Improvements in Christmas-Tree Stands, of which the following is a specification containing a full, clear, and exact description, reference being had to the accompanying drawings, forming a part thereof.

My invention relates to improvements in Christmas tree stands and has for its primary object a stand for supporting Christmas trees in which the use of wedges or the trimming of the trunk is eliminated.

A further object is to construct a Christmas tree stand which is readily adjustable and which can be so arranged as to either be used for the ordinary support of a tree or for supporting the tree in a container so that moisture can be supplied and the tree kept in a fresh condition for a longer period of time than is possible with the ordinary stand.

In the drawings:

Fig. 1 is a perspective view of my device in assembled position showing the manner of securing the tree therein;

Fig. 2 is an enlarged perspective view of the auxiliary securing means;

Fig. 3 is a perspective view with a tree in position and showing a different arrangement of the auxiliary securing means;

Fig. 4 is a perspective view showing my stand arranged similar to the ordinary X stand;

Fig. 5 is a perspective view showing my device arranged for supporting large trees and Fig. 6 is a perspective view of a modified form of support when the tree is to be placed in a bowl or ornamental stand.

In the construction of my device I employ side members 7 and 8, there being two of each members, the members 7 are provided on one edge with narrow slots 9 in which auxiliary fastening members 10 are designed to be placed, the auxiliary members comprise an L shaped piece having portions 11 and 12, these portions as will be noted are of different width, the purpose of which will be explained in detail later. Openings 13 are provided in the portions 11 and 12 through which fastening means such as nails and the like can be inserted and driven into the trunk of the tree. The edge of the members 7 opposite the edge in which the slots 9 are formed, is provided with a plurality of slots 14 which extend approximately half way the width of each member, these slots are sufficiently large to allow the insertion of the members 8. At the center of the members 7 and in the same edge in which the slots 14 are formed, I form a recess 15, this recess is of the same width as the members 8 and its depth corresponds to the thickness thereof, the purpose of this recess is illustrated in Fig. 4 and will be explained in detail later. The members 8 are likewise provided in one edge with recesses 16, this is for the purpose of permitting the assembly shown in Fig. 5.

The manner of assembling and securing a tree is as follows:—The members 7 and 8 are placed in the position shown in Figs. 1 and 3, the tree trunk is then held and the members 7 pushed together until they contact with the trunk, after this, nails or similar fastening means 17 are driven into the trunk through suitable openings formed in the members 7, the auxiliary fastening members 10 are then placed in position in the slots 9 and by placing these members in various positions, it is possible to take in trunks of various diameters.

The auxiliary members may be placed in position in any of the following ways, first— by having the flat faces of either the portions 11 or 12 against the trunk of the tree, the other portion extending away from it; second—the flat face of one auxiliary fastening member against the tree trunk and the portion 12 of the other member against or slightly embedded in the bark of the tree; third—the same position as described in the second, but with the portion 11 against the tree trunk; fourth—both portions 11 against the tree trunk; fifth—one portion 11 and one portion 12 against the tree trunk and sixth—both portions 12 against the tree trunk. After the auxiliary members have been placed in position, fastening means are also inserted through the openings 13 and driven into the trunk.

When the device is assembled as in Figs. 1 and 3 the butt of the trunk can be set into a pan in which water is placed to keep the tree fresh.

When the assembly shown in Fig. 4 is used one of the members 8 is discarded, the other member 8 has a hole formed central there-through through which a nail 18 is driven into the trunk, this secures the member 8 to the bottom of the tree, the members 7 are then placed in such a position that the member 8 enters the recess 15, this allows the edge of the members 7 to contact with the floor and gives an X effect with one arm in one direction and two arms in the other, the fastening means 17 are then driven into the trunk of the tree as previously described and the auxiliary fastening means 10 then placed in position in any of the positions previously described, found necessary.

When my device is used to support large trees, the adjustment is obtained by using the slots 14 and 16, this allows the members 7 and 8 to rest flat on the floor in the shape of a double X, after which the fastening means are inserted through the members and into the trunk of the tree, this has been found desirable for supporting large trees such as are used in halls or churches.

In Figure 6 I have shown a modified form of construction in which members 20 and 21 are employed. These members are provided with slots 22 so that the members can be secured together as illustrated. Approximately midway the ends of these members are formed openings through which fastening means 23 can be inserted and driven into the trunk of the tree. In securing this device to the tree it is necessary to bend the members, as illustrated, this can be readily accomplished as the members are made of sheet metal. This construction is used when it is desired to place the tree in a jardiniere or other fancy support, the projecting ends are bent so that they fit snugly into the support and then sand may be placed around the tree and over the support which gives the support weight and prevents overturning. When sand is used it is preferably kept moist so that it also has a refreshing effect on the tree.

Having fully described my invention, what I claim is:—

1. A Christmas tree support comprising a plurality of members provided in one edge with a plurality of slots whereby the same may be assembled in the form of an adjustable X, said members being also provided with openings adapted to receive fastening means whereby the trunk of a tree may be secured within the support, and adjustable auxiliary L-shaped supports carried by some of said members, said supports adapted to contact with the trunk of the tree and be secured thereto.

2. A Christmas tree stand comprising a pair of supports adapted to be secured to opposite sides of a tree trunk adjacent its base, said supports provided with a plurality of spaced apart slots in their lower edges, a pair of additional supports provided with a plurality of spaced apart slots in one edge and also with slots in their opposite edges, the first mentioned slots adapted to receive the first mentioned supports, said pairs of supports when assembled adapted to form a socket to receive a tree trunk, and auxiliary fastening means provided with different width flanges adapted to be inserted in the last mentioned slots of the last mentioned pair of supporting members, said auxiliary fastening members being provided with an opening in each of their flanges to receive a fastening means.

3. A Christmas tree support comprising a pair of supports provided with centrally arranged openings through which fastening means may be inserted for securing the same to the trunk of a tree, each of said supports being provided centrally of its length with a recess in its lower edge, and a horizontal support located in said recesses and flush with the lower edges of said supports, said horizontal support being provided with an opening through which fastening means may be inserted for securing said horizontal support to the lower end of a tree trunk.

In testimony whereof I have signed my name to this specification.

EDWARD J. JUTZ, Sr.